(No Model.) 2 Sheets—Sheet 2.
W. N. JONES.
HAY RAKE AND LOADER.
No. 554,519. Patented Feb. 11, 1896.
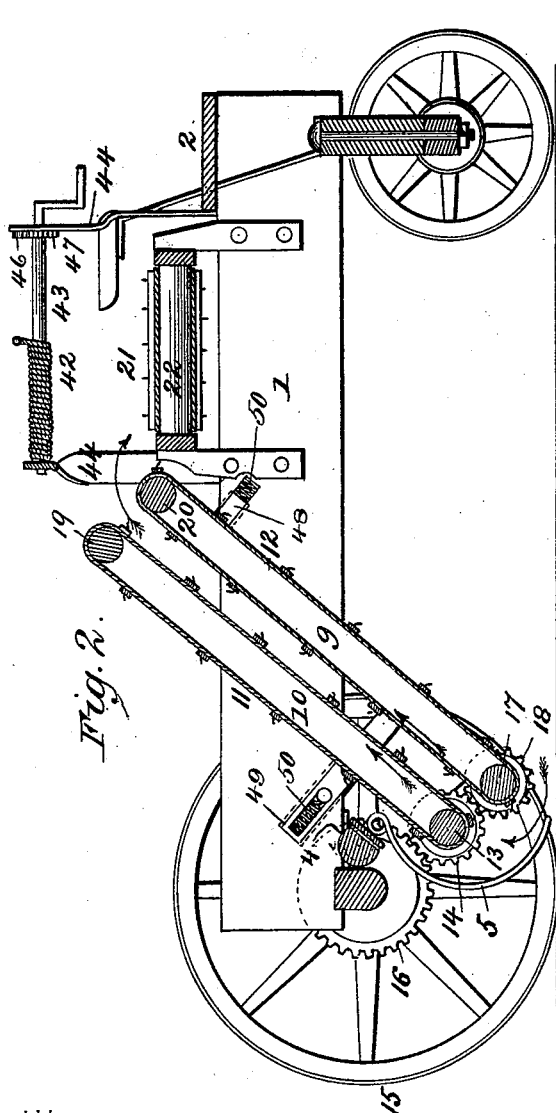
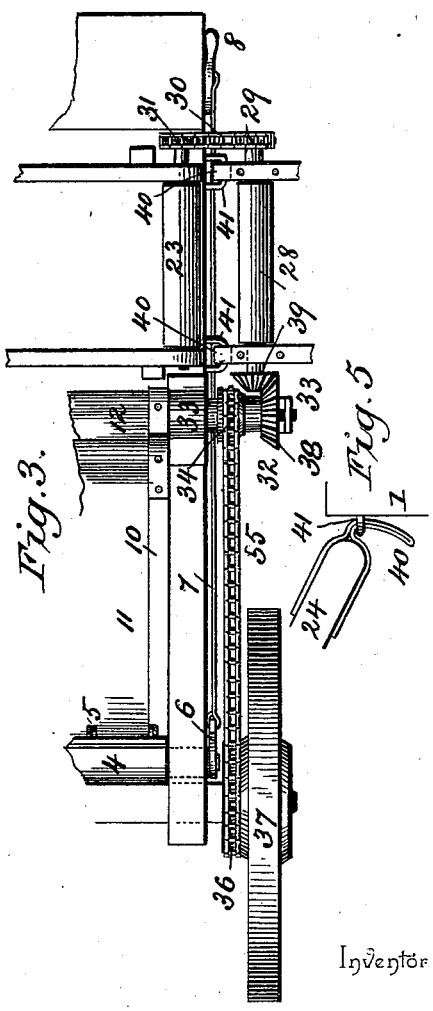
Witnesses
A. E. Dieterich
Inventor
Wesley. N. Jones
By his Attorneys.
C. A. Snow & Co.

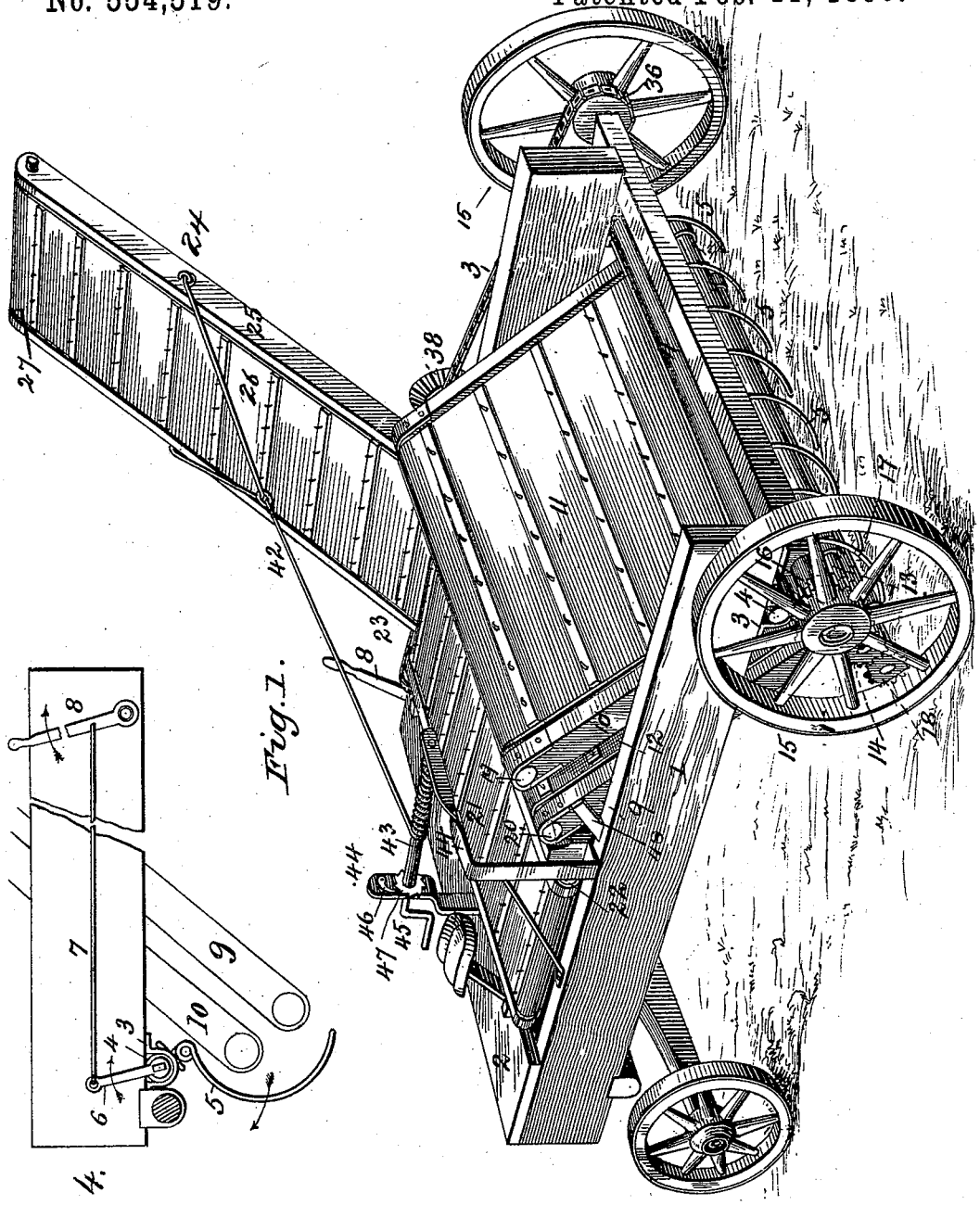

UNITED STATES PATENT OFFICE.

WESLEY N. JONES, OF SPRING VALLEY, ARKANSAS.

HAY RAKE AND LOADER.

SPECIFICATION forming part of Letters Patent No. 554,519, dated February 11, 1896.

Application filed August 21, 1894. Serial No. 520,922. (No model.)

*To all whom it may concern:*

Be it known that I, WESLEY N. JONES, a citizen of the United States, residing at Spring Valley, in the county of Washington and State of Arkansas, have invented a new and useful Hay Rake and Loader, of which the following is a specification.

My invention relates to a hay rake and loader, and it has for its object to provide a simple, inexpensive, and efficient device, adapted to lift the hay and convey it forward, thence laterally, and deposit it in a vehicle which is driven at the side of the loader.

Further objects and advantages of the invention will appear in the following description, and the novel features thereof will be particularly pointed out in the appended claim.

In the drawings, Figure 1 is a perspective view of a machine embodying my invention.
Fig. 2 is a vertical central section of the same. Fig. 3 is a detail view showing the means for communicating motion from one of the ground-wheels to the carrier-aprons. Fig. 4 is a detail view showing the means for adjusting the rake.

Similar numerals of reference indicate corresponding parts in all the figures of the drawings.

The framework of the improved machine is provided with the side beams 1, which are connected at their front ends by the transverse platform 2, supporting the driver's seat. Mounted in bearings 3 near the rear ends of the side beams are the extremities of the rock-bar 4 which carries the rake-teeth 5, preferably curved forward toward their lower ends, as shown clearly in Fig. 2. Connected to one extended trunnion of this rock-bar is a crank-arm 6, in turn connected, by means of the rod 7, with the hand-lever 8, arranged near the seat.

Parallel inclined carrier-frames 9 and 10 are arranged in the rear portion of the framework in advance of the rake, and in bearings formed in the upper and lower ends of these frames are mounted the rollers which support and guide the upper and lower carrier-aprons, 11 and 12. The rear roller 13 of the upper apron is extended at one end and fitted with a pinion 14 which receives motion from the adjacent ground-wheel 15 by means of the gear-wheel 16 secured to said wheel, and the rear roller 17 of the lower apron is similarly extended and fitted with a pinion 18 which meshes with the pinion 14, whereby the upper and lower aprons are driven in opposite directions. Thus the inner or adjacent sides of the aprons travel in the same direction, as shown by the arrows in Fig. 2. The upper rollers 19 and 20 serve as idlers to carry the front ends of the aprons.

21 represents a transverse conveyer, arranged at the front end of the carrier-aprons in position to receive the hay as it leaves the latter, said conveyer consisting of a horizontal apron carried by the longitudinally-disposed rollers 22 and 23 mounted in bearings upon the side beams of the framework.

Removably attached to one of the side beams of the framework, in alignment with the transverse conveyer, is the elevator 24, having a frame 25 normally held at an inclination in order to extend over an adjacent vehicle, (not shown,) an apron 26, and upper and lower rollers 27 and 28 which carry said apron. The lower roller is provided with a chain-wheel 29 connected by means of a chain 30 with a similar chain-wheel 31 on the end of the adjacent roller 23 of the transverse conveyer.

32 represents a counter-shaft mounted in bearings in the bracket 33 attached to the side beam of the main framework and carrying a chain-wheel 34, which is connected by means of a chain 35 with a chain-wheel 36 carried by the ground-wheel 37. Said shaft also carries a bevel-gear 38 which meshes with a similar gear 39 on the rear end of the lower roller of the elevator.

The means for attaching the elevator-frame to the main framework consist of curved hooks 40 attached to said frame and adapted to engage keepers 41 on the adjacent side beam of the main framework, and connected to an intermediate or upper part of the elevator-frame is a guy-rope 42 which is reeled upon a drum 43 mounted in bearings in the standards 44 rising from the main framework. This drum is provided with a crank 45 by which it may be rotated to regulate the inclination of the elevator-frame, suitable means—such as a pawl 46 and ratchet-wheel 47—being provided to prevent backward rotation of the drum. This means of attachment of the elevator to the main framework provides for easy removal, and at the same time enables the inclination of the elevator to be altered without moving the intermeshing gears out of operative relation.

Inasmuch as the hooks 40 are approximately concentric with the roller 28, and inasmuch as the chain 30 connects the chain-wheels 29 and 31 which are carried by the rollers 28 and 23, the elevator-frame is held from movement outward and downward by said chain 30 (the wheel 31 being above the plane of the wheel 29) and from moving inward or toward the framework by the hooks 40, which bear against the side of the frame, and said elevator-frame may be inclined more or less without disengaging the intermeshing gears 38 and 39. The said construction causes the roller 28 to serve as the fulcrum of the elevator-frame, and the guy-rope by which the upper end of said frame is supported may be adjusted to provide the necessary inclination.

The operation of the mechanism will be readily understood from the foregoing description, and it will be seen that various changes in the form, proportion, and minor details of construction may be resorted to without departing from the spirit or sacrificing any of the advantages of the invention.

In connection with the above-described mechanism I employ means for giving a resilient movement to the lower apron of the elevator. The construction of these means may vary according to the particular construction of the framework; but in the drawings I have shown supporting-arms 48 and 49 secured respectively to the upper and lower ends of the side frame-bars of the lower apron and fitting in guide-grooves in the side beams of the framework. In order to cause a pressure of the lower apron toward the upper apron springs 50 are used in connection with said arms.

The spring which is used in connection with the lower or rear arm 49 is arranged in a slot in said arm, bearing at its upper end against the upper end of said slot and at its lower end against a stud or projection which extends into the slot; and the arm 48 bears at its extremity against one end of a spring 50 located in the groove in which said arm is mounted.

It will be understood that the amount of movement of the lower apron from the upper apron, without disengaging the teeth of the gears 14 and 18, is regulated by the depth of the teeth of said gears. By making the teeth of considerable depth any desired amount of movement may be secured, but in practice a small movement is sufficient to prevent choking and secure an easy operation of the aprons.

The upper apron, 11, may be secured to the body of the vehicle by any suitable or well-known means, as by bolts, engaging the side bars of said frame and the sides of the body.

Having thus described my invention, I claim—

In a machine of the class described, the combination with a supporting-framework, a rake, parallel-spaced carrier-aprons arranged at their rear ends adjacent to the rake, a transverse conveyer, and means for operating said parts, of an elevator, intermeshing gears on the lower apron-carrying roller of the elevator and upon the adjacent roller of one of the carrier-aprons, hooks on the lower end of the elevator-frame engaging keepers on the framework and bearing against the adjacent portion of the frame, said hooks being approximately concentric with the lower roller of the elevator, and a guy-rope, and operating devices for supporting the upper end of the elevator, substantially as specified.

In testimony that I claim the foregoing as my own I have hereto affixed my signature in the presence of two witnesses.

WESLEY N. JONES.

Witnesses:
ROBERT M. JONES,
JOAL J. HAMMANS.